J. P. WELSCH.
CLEANING DEVICE FOR RAKES.
APPLICATION FILED MAR. 28, 1916.
1,195,885.
Patented Aug. 22, 1916.
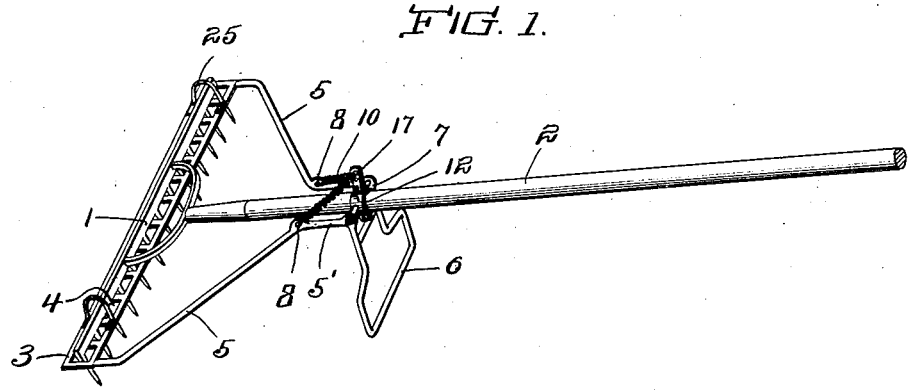
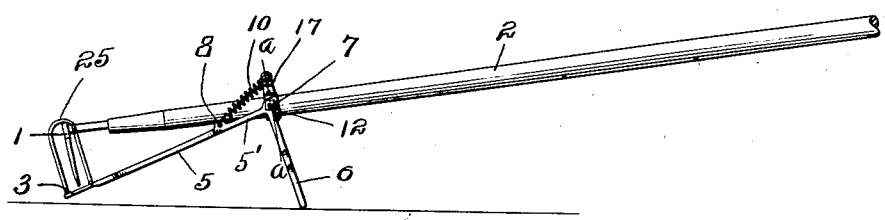
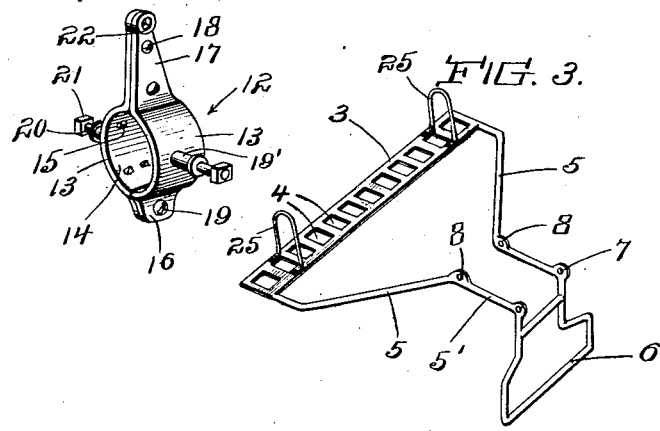
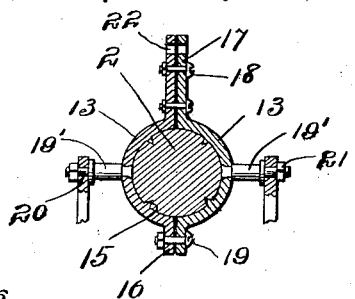
Witness
A. C. Newkirk
Inventor
J. P. Welsch,
By Victor J. Evans
Attorney

UNITED STATES PATENT OFFICE.

JOSEPH P. WELSCH, OF NOKOMIS, ILLINOIS.

CLEANING DEVICE FOR RAKES.

1,195,885.  Specification of Letters Patent.  Patented Aug. 22, 1916.

Application filed March 28, 1916. Serial No. 87,267.

*To all whom it may concern:*

Be it known that I, JOSEPH P. WELSCH, a citizen of the United States, residing at Nokomis, in the county of Montgomery and State of Illinois, have invented new and useful Improvements in Cleaning Devices for Rakes, of which the following is a specification.

This invention relates to improvements in cleaning devices for rakes and similar toothed implements, and an object of the invention is to produce a device of this character which may be easily and quickly positioned upon the handle of an ordinary rake without weakening the said handle and which shall be provided with an offset or fulcrum member which, when contacted, will cause the cleaning member of the device to sweep between the teeth of the rake to effectively remove all matter or substances therefrom.

It is also my purpose to provide a device of this character wherein the teeth of the rake will be guided through the cleaning member and limited in its movement, so that the said rake will not become detached from the said cleaning member.

It is a further object of the invention to provide a cleaning device for rakes which can be operated to clean the rake by directing a pressure on the handle of the rake.

With the above and other objects in view the improvement resides in the construction, combination and arrangement of parts set forth in the following specification and falling within the scope of the appended claim.

In the drawing: Figure 1 is a perspective view of a rake provided with my improvement, Fig. 2 is a side elevation of the same illustrating the manner in which the cleaning member may be operated by the tilting of the handle of the rake, Fig. 3 is a perspective view of the device detached, Fig. 4 is a detail enlarged sectional view approximately on the line *a—a* of Fig. 2, and Fig. 5 is a perspective view of the attaching sleeve or collar.

In the drawings the numeral 1 designates a rake of any ordinary construction which is provided with the usual handle 2.

The numeral 3 designates a plate which is formed with a plurality of slots 4 and one of each of the teeth of the rake is adapted to be received in one of the said slots 4 of the plate 3. Formed at the ends of the plate 3 are inwardly extending arms 5 which terminate in spaced parallel members or extensions 5' that are sufficiently spaced to permit of the same being arranged to the opposite sides of the handle 2 of the rake. The members 5' have their ends bent angularly to provide a substantially bail-shaped connecting member 6 and this member 6 forms a fulcrum or operating element for swinging the device to cause the plate 3 to sweep between the teeth of the rake, in a manner which will presently be set forth. The parallel arms or extensions 5' at the juncture thereof with the angular portions 5 of the arms are formed with ears 8, and the said arms 5' at the ends thereof or at the juncture of the bail 6 therewith are provided with similar ears 7.

The numeral 12 designates a collar or sleeve which is adapted to be arranged upon the handle 2 of the rake. The sleeve 12 comprises a pair of similarly formed sections 13—13, each of which having an oppositely disposed semi-cylindrical portion 14 formed with inturned teeth 15 and the ends of these portions 14 are provided with oppositely extending ears 16 and 17. The ears 16 and 17 lap and are connected by adjustable elements 18 and 19 respectively, and by this arrangement it will be noted that the semi-cylindrical portions of the sleeves may be forced into tight embrace with the opposite sides of the handle 2, and the teeth 15 thereof inserted in the said handle to effectively sustain the sleeve upon the handle and without injury to the said handle. The central or circular portion of the sleeve 12 is formed upon its outer face with laterally extending axle members 19', the ends of the same being reduced and threaded, as at 20, and these reduced portions adapted to be passed through openings in the ears 7, nuts 21 securing the said ears upon the axles. The ears 17, at the ends are provided with an eye or opening 22, and springs 10 are secured each to one of the ears 8 and have their free ends connected with the said eye or opening 22. The springs 10 exerting a pressure between the ears 17 of the rigid sleeve or collar 12 and the pivoted cleaning device will normally force the plate 3 against the head of the rake, and by swinging the bail 6 toward the handle 2 the plate 3 will be moved toward the end of the teeth, dislodging any foreign matter. It will be apparent, by reference to Fig. 2 of the drawings, that when the bail member 6 is permitted to rest upon the ground and the handle 2 is moved or swung toward the ground, the said member 6 will serve as a fulcrum or holding member for the plate 3 to permit of the teeth of the rake being drawn through the slots 4 of the plate 3 and if desired to contact with the opposite walls provided by the said slots. The plate 3 adjacent the opposite ends thereof is formed with upwardly extending substantially U-shaped guide members 25—25, which straddle the head of the rake. These guide members are of a less length than the teeth of the rake so that the slotted plate 3 will not be brought entirely off the teeth of the rake when the device is actuated for cleaning the rake.

From the above description, taken in connection with the accompanying drawings the simplicity of the device as well as the advantages thereof will, it is thought, be perfectly apparent to those skilled in the art to which such invention appertains without further detailed description.

Having thus described the invention, what I claim is:

In combination with a rake having a handle, of a slotted plate receiving the teeth of the rake, inwardly extending angular arms formed at the end of the plate, said arms having their ends formed with an angular bail-shaped connecting member, a divided sleeve upon the handle having inturned teeth, means for connecting the members of the sleeve to bind the same upon the handle to force the teeth thereof into the handle, laterally extending axles upon the sleeve received in bearings in the arms, and means for securing the arms to the said axles, said sleeve including an upstanding ear, and spring members connected with the ear and to each of the arms, as and for the purpose set forth.

In testimony whereof I have affixed my signature in presence of two witnesses.

JOSEPH P. WELSCH.

Witnesses:
HARRY C. MILLER,
J. D. WELSCH.